United States Patent
Reynolds et al.

(10) Patent No.: US 7,766,227 B2
(45) Date of Patent: Aug. 3, 2010

(54) TRANSACTION CARD WITH MOVABLE MEMBER

(75) Inventors: Adam W. Reynolds, Minneapolis, MN (US); Ted C. Halbur, Lino Lakes, MN (US); Dennis R. Smith, Minnetonka, MN (US)

(73) Assignee: Target Brands, Inc., Minneapolis, MN (US)

( * ) Notice: Subject to any disclaimer, the term of this patent is extended or adjusted under 35 U.S.C. 154(b) by 395 days.

(21) Appl. No.: 11/965,474

(22) Filed: Dec. 27, 2007

(65) Prior Publication Data

US 2009/0166437 A1 Jul. 2, 2009

(51) Int. Cl.
*G06K 5/00* (2006.01)
*G06K 17/00* (2006.01)
*G06K 19/06* (2006.01)

(52) U.S. Cl. .................. 235/380; 235/375; 235/449; 235/451; 235/487; 235/492; 235/493; 40/124.01; 40/124.05; 40/124.19; 40/360; 40/405; 40/411; 40/415; 40/416; 40/417; 40/418; 40/419; 40/420; 40/421

(58) Field of Classification Search .......... 235/375, 235/380, 449, 487, 492, 493; 40/124.01, 40/124.05, 124.19, 360, 409, 411, 415–421; 446/147–152; 206/459.5
See application file for complete search history.

(56) References Cited

U.S. PATENT DOCUMENTS

| | | | |
|---|---|---|---|
| 744,545 A | 11/1903 | Hervey | |
| 966,107 A | 8/1910 | Lowe | |
| 976,495 A * | 11/1910 | Reeves | 446/151 |
| 1,041,573 A * | 10/1912 | Baring-Gould | 40/486 |
| 1,546,928 A | 7/1925 | Graham | |
| 1,618,710 A | 2/1927 | Hose | |
| 1,951,022 A | 3/1934 | Iverson | |
| 1,961,973 A | 6/1934 | Jenkins | |
| D142,161 S | 8/1945 | Braund | |
| 2,476,742 A | 7/1949 | Lareau et al. | |

(Continued)

FOREIGN PATENT DOCUMENTS

GB 2277482 A 11/1994

OTHER PUBLICATIONS

GiftCard with Rotating Pinwheel Offered for Sale at Target retail stores beginning Dec. 26, 2004 (2 pages).

(Continued)

*Primary Examiner*—Thien Minh Le
*Assistant Examiner*—Tuyen K Vo
(74) *Attorney, Agent, or Firm*—Griffiths & Seaton PLLC (57) ABSTRACT

A transaction card includes a base member, an auxiliary member and an account identifier. The base member defines a first surface, a second surface opposite the first surface and a slot extending therethrough. The auxiliary member includes a first section and a handle section and is coupled with the base member such that the first section is disposed on the first surface of the base member. The handle section extends from the first surface, through the slot and to the second surface of the base member such that movement of the handle section causes movement of the auxiliary member relative to the base member. The account identifier is included on one of the base member and the auxiliary member and links the transaction card to at least one of an account and a record.

22 Claims, 10 Drawing Sheets

U.S. PATENT DOCUMENTS

| | | | |
|---|---|---|---|
| 2,573,625 A * | 10/1951 | Swart | 40/422 |
| 2,728,167 A | 12/1955 | Knott | |
| 2,732,655 A | 1/1956 | Dirckx | |
| 2,787,852 A | 4/1957 | Youngren | |
| 2,815,605 A | 12/1957 | Connell | |
| 2,834,123 A | 5/1958 | Knight | |
| 2,931,657 A | 4/1960 | Lewis | |
| 3,710,508 A | 1/1973 | McLaren | |
| 3,717,942 A | 2/1973 | Presby | |
| 4,054,242 A | 10/1977 | Strobe | |
| 4,309,839 A | 1/1982 | White et al. | |
| 4,341,035 A | 7/1982 | Jaworski et al. | |
| 5,548,913 A * | 8/1996 | Randolph et al. | 40/491 |
| 5,871,237 A | 2/1999 | Hunt | |
| 6,146,721 A | 11/2000 | Freynet | |
| 6,428,382 B1 * | 8/2002 | Randolph | 446/149 |
| 2002/0096873 A1 | 7/2002 | Scheinblum | |
| 2002/0143697 A1 | 10/2002 | Gotfried | |
| 2004/0249748 A1 | 12/2004 | Schultz et al. | |
| 2005/0061889 A1 | 3/2005 | McGee et al. | |
| 2006/0021272 A1 * | 2/2006 | Kleissler et al. | 40/773 |
| 2007/0155281 A1 | 7/2007 | Chang | |
| 2007/0295820 A1 * | 12/2007 | Halbur et al. | 235/487 |

OTHER PUBLICATIONS

TOYS "R" US, Colorforms Games Silly Faces, http://www.amazon.com, printed on May 23, 2006 (6 pages).

Halbur et al., "Stored-Value Card With Movable Graphic Portion," U.S. Appl. No. 11/473,393, filed Jun. 23, 2006.

* cited by examiner

TRANSACTION CARD WITH MOVABLE MEMBER

BACKGROUND OF THE INVENTION

Stored-value cards and other transaction cards come in many forms. A gift card, for example, is a type of transaction card that includes a pre-loaded or selectively loaded monetary value. In one example, a consumer buys a gift card having a specified value for presentation as a gift to another person. In another example, a consumer is offered a gift card as an incentive to make a purchase. A gift card, like other transaction cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction cards provide a number of advantages to both the consumer and the retailer.

SUMMARY OF THE INVENTION

One aspect of the present invention relates to a transaction card including a substrate, an elongated auxiliary member and an account identifier. The base member defines a first surface, a second surface opposite the first surface and a slot extending through the base member. The auxiliary member includes a first section and a handle section. The auxiliary member is coupled with the base member such that the first section is disposed on the first surface of the base member and the handle section extends from the first surface of the base member, through the slot and to the second surface of the base member such that movement of the handle section causes movement of the first section of the auxiliary member relative to the base member. The account identifier is included on one of the base member and the auxiliary member and links the transaction card to at least one of an account and a record and is machine readable by a point-of-sale terminal. Stored-value cards, methods of providing a transaction card, and other embodiments of stored-value or transaction cards and associated combinations are also disclosed.

BRIEF DESCRIPTION OF THE DRAWINGS

Embodiments of the invention will be described with respect to the figures, in which like reference numerals denote like elements, and in which.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

A stored-value card or transaction product, such as a gift card or other transaction card, is adapted for making purchases of goods and/or services at, for example, a retail store or web site. According to one embodiment, an original consumer buys a transaction card to give a recipient who in turn is able to use it to pay for goods and/or services. A transaction card, according to embodiments of the present invention, provides the consumer and recipient with extra amusement in addition to the ability to pay for goods and/or services with the stored-value card.

In particular, according to one embodiment, the transaction card includes a base member movably coupled with an auxiliary member. In one example, the base member depicts at least one graphic that is covered or otherwise hidden by the auxiliary member when the auxiliary member is in a first position relative to the base member. Upon moving the auxiliary member to a second position relative to the first member, the hidden graphic is revealed to the amusement of a bearer and any other observers of the transaction product. In one example, the auxiliary member is repeatedly movable between the first position and the second position while the auxiliary member remains coupled to the base member. In one embodiment, this amusing aspect of the transaction card promotes sale, use and/or loading of the transaction card by potential consumers and/or bearers of the transaction card.

Turning to the figures, FIGS. 1-9 illustrate various views of one embodiment of a transaction card 10 (e.g., a stored-value card, gift card or calling card). The transaction card 10 includes a first or base member 12, a second or auxiliary member 14 and a connection device 16. Base member 12 provides overall rigidity to stored-value card 10 and supports auxiliary member 14. Auxiliary member 14 is movably coupled to base member 12 with connection device 16.

In one embodiment, base member 12 defines a first surface 20 (i.e., a first major surface) and a second surface 22 (i.e., a second major surface) opposite first surface 20 separated by a thickness of transaction card 10. In one embodiment, at least one of first and second surfaces 20 and 22 is substantially planar. In one example, base member 12 is substantially rectangular in shape, and, in one embodiment, is similarly sized to an identification card, a credit card, or other card sized to fit in a wallet of a card bearer (i.e. is wallet sized). Accordingly, in one example each of first surface 20 and second surface 22 are substantially rectangular and/or otherwise wallet sized. In particular, in one embodiment, the overall dimensions of base member 12 are about 8.5 cm by about 5.5 cm wide with a thickness of less than about 1 mm. In other embodiments, base member 12 is otherwise shaped as a square, circle, oval, star, or any other suitable shape.

Base member 12 is formed of any suitable substrate such as a somewhat rigid yet flexible material similar to that commonly used for identification cards, credit cards, etc. More specifically, in one embodiment, base member 12 is a substantially planar member formed of paper, cardstock, plastic (e.g. polycarbonate, polystyrene, polyvinyl chloride (PVC), acrylonitrile butadiene styrene (ABS), polyethylene terephthalate (PET), teslin, polyactide (PLA) or acrylic) or other suitable material. In one embodiment, base member 12 is formed of injection molded plastic or cut from sheet-stock plastic material. Base member 12 can be formed in any other suitable planar or non-planar configuration as will be apparent to those of skill in the art upon reading this application.

Figure 1:
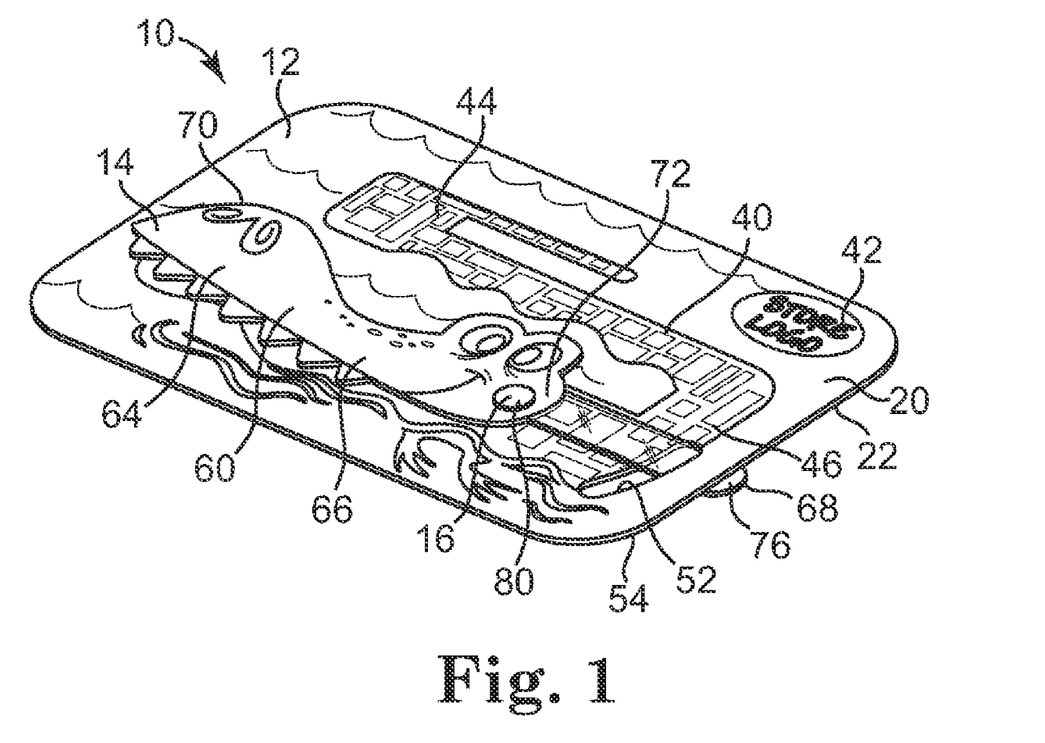
FIG. 1 is a perspective view illustration of a transaction card with an auxiliary member in a first position, according to one embodiment of the present invention.
Figure 2:
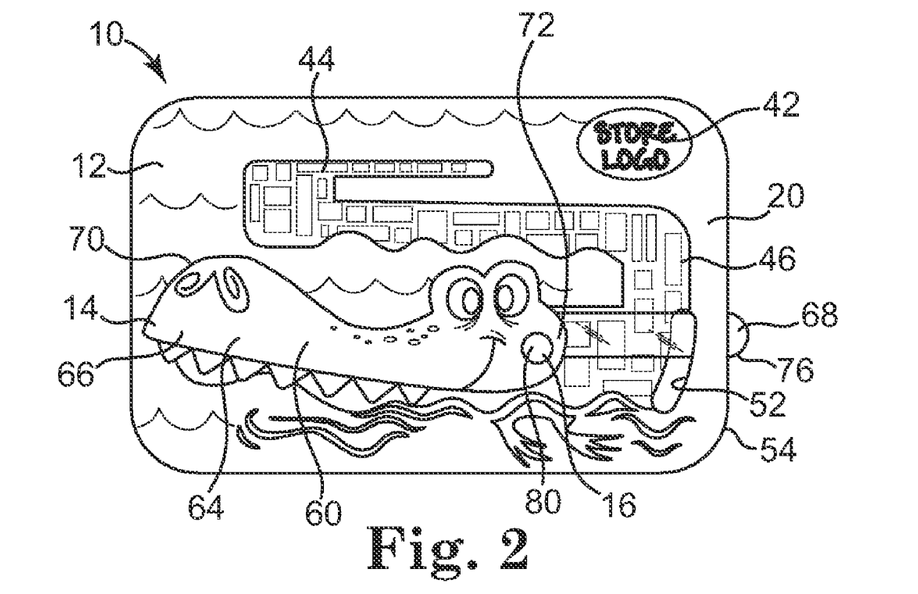
FIG. 2 is a front view illustration of the transaction card of FIG. 1.
Figure 3:
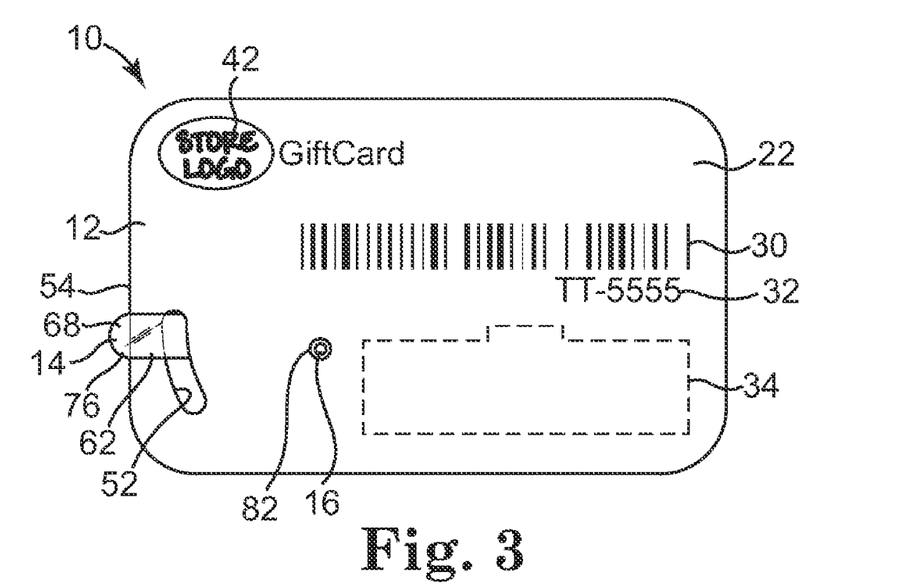
FIG. 3 is a rear view illustration of the transaction card of FIG. 1.
Figure 4:
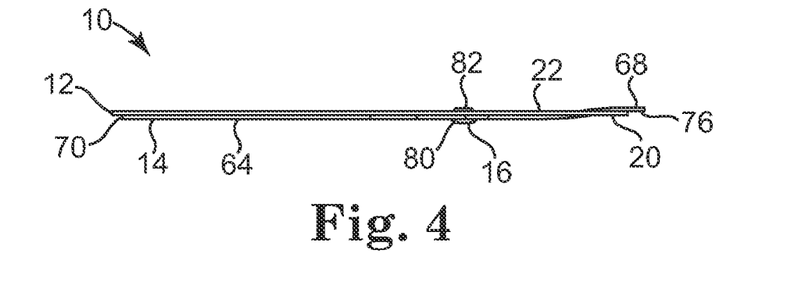
FIG. 4 is a top view illustration of the transaction card of FIG. 1.
Figure 5:
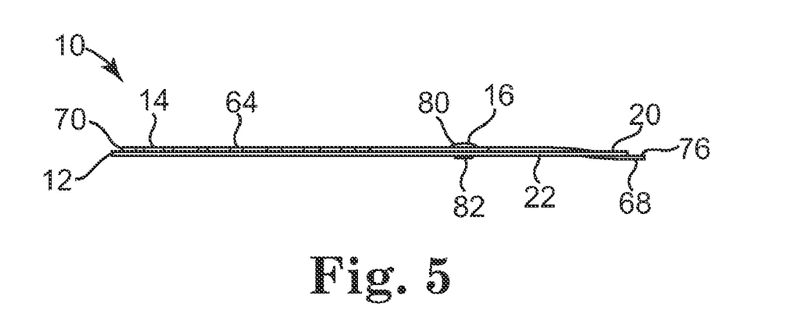
FIG. 5 is a bottom view illustration of the transaction card of FIG. 1.
Figure 6:
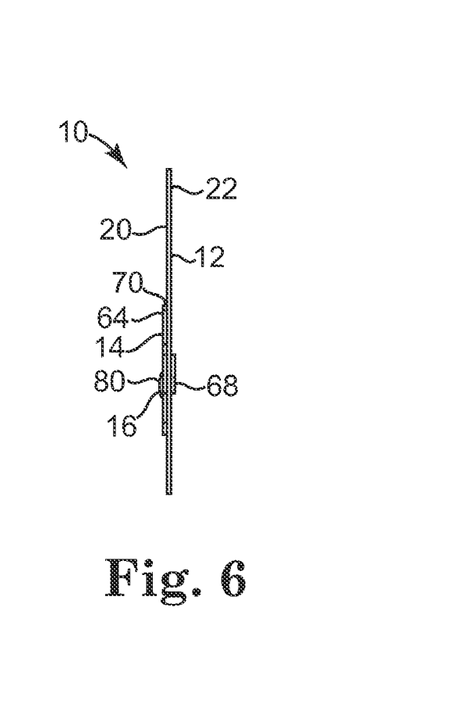
FIG. 6 is a right side view illustration of the transaction card of FIG. 1.

Referring to the rear view illustration of FIG. 3, in one example second surface 22 of base member 12 or any other suitable portion of transaction card 10, includes at least one account activation area or account identifier 30, such as a bar code, magnetic strip, a smart chip or other electronic device, a radio frequency identification (RFID) device or other suitable identifier readily machine readable by a point-of-sale terminal or other account access station or kiosk. Account identifier 30 indicates an account or record to which transaction card 10 is linked. The account or record of the monetary or other balance on transaction card 10 optionally is maintained on a database, other electronic or manual record-keeping system or, in the case of "smart" cards for example, on a chip or other electronic device(s) on transaction card 10 itself. Accordingly, by scanning account identifier 30, the account or record linked to transaction card 10 is identified and can subsequently be activated, have amounts debited therefrom and/or have amounts added thereto.

In one embodiment, account identifier 30 includes a character string or code 32 (e.g., a number and/or letter string) configured to provide additional security to the user of transaction card 10 and/or configured to be read by a bearer of transaction product 10 to facilitate use of transaction card 10 for web site or other purchases outside of brick-and-mortar type retail establishments. With the above in mind, account identifier 30 is one example of means for linking transaction card 10 with an account or record, and scanning of account identifier 30 is one example of means for activating or loading value on transaction card 10.

In one embodiment, redemption indicia 34 are included on transaction card 10 such as on second surface 22 of base member 12. Redemption indicia 34 indicate that transaction card 10 is redeemable for the purchase of goods and/or services and that, upon use, a value of the purchased goods and/or services will be deducted from the account or record linked to transaction card 10. In one embodiment, redemption indicia 34 include phrases such as "<NAME OF STORE> GiftCard" and "This GiftCard is redeemable for merchandise or services at any of our stores or at our web site," and/or provides help or phone line information in the case of a lost, stolen, or damaged transaction card, etc.

Figure 7:
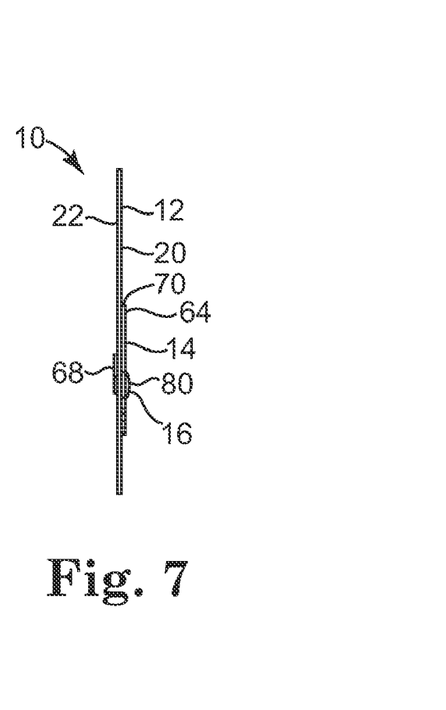
FIG. 7 is a left side view illustration of the transaction card of FIG. 1.
Figure 9:
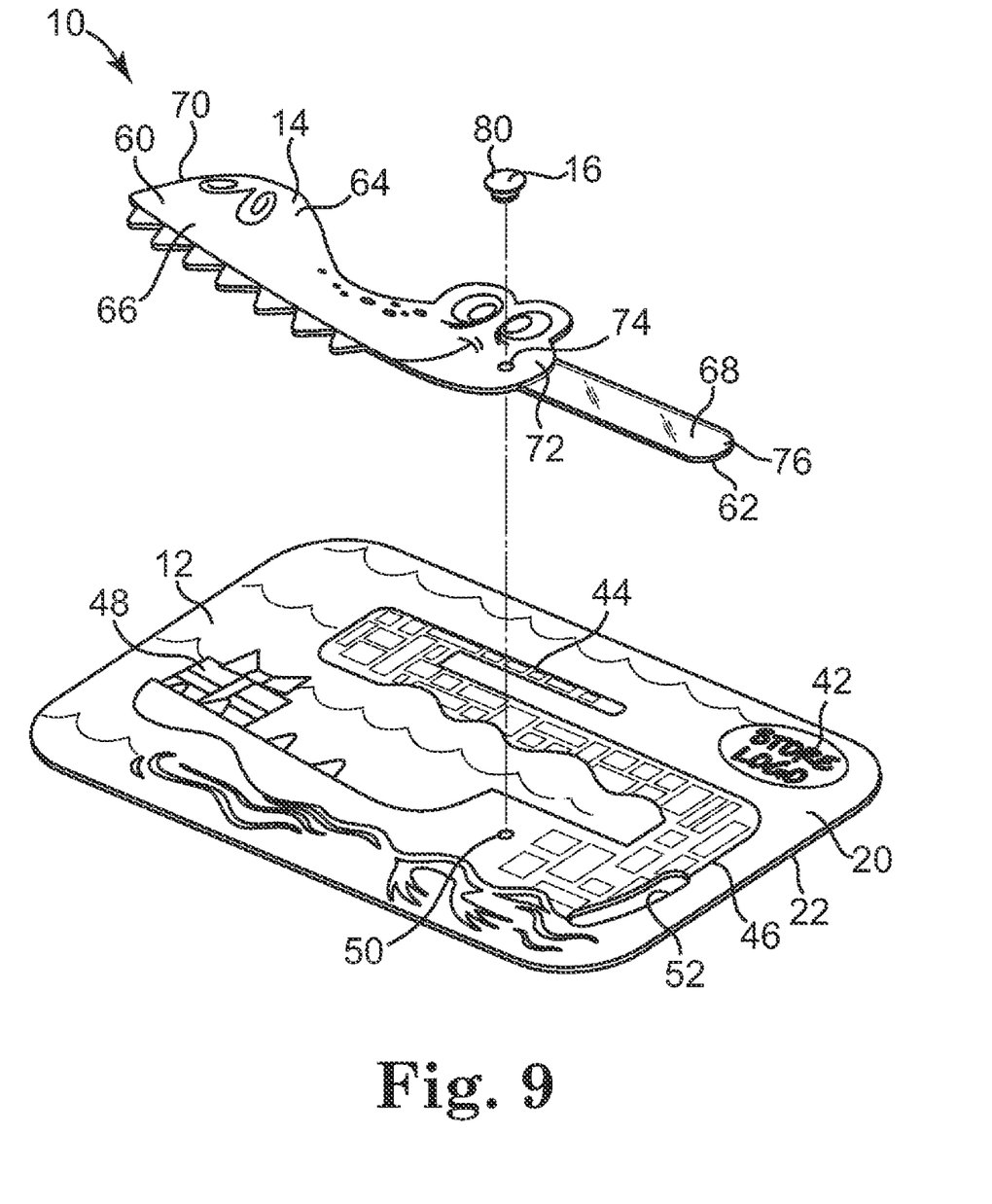
FIG. 9 is an exploded perspective view illustration of the transaction card of FIG. 1, according to one embodiment of the invention.

In one embodiment, first surface 20 of base member 12 or other suitable portion of transaction card 10 includes background indicia 40. Background indicia 40 include any suitable graphics, text, or combinations thereof. In one example, background indicia 40 include one or more of a brand identifier 42, a first portion 44 of a graphic or subject 46 and a depicted article (FIGS. 7 and 9). In one example, any one or more of redemption indicia 34, brand identifier 42, first portion 44 of subject 46 and article 48 may not be included on transaction card 10. Brand identifier 42 includes one or more of a logo, text, trademark, etc. that associate transaction card 10 with at least one of a product, a brand, a store, etc.

In one embodiment, subject 46 is any fictional or non-fictional character, an animal (e.g. a mammal or a reptile), a person, an insect, a scene, text, an object, a design, a picture, a graphic etc. that can be visually divided into multiple portions and is collectively defined by at least two members of transaction card 10, for example, by base member 12 and auxiliary member 14. First portion 44 of subject 46 is any suitable portion of subject 46 as will be apparent upon reading the present application. In one embodiment, first portion 44 of subject 46 illustrates less than all of subject 46. For example, as illustrated in FIGS. 1-9, subject 46 is an alligator, and first portion 44 of subject 46 includes a body and lower jaw of the alligator but does not generally include an upper jaw, eyes, nose and/or upper head portion of the alligator.

Article 48 is any representation of an article or item and is configured to be selectively covered and uncovered when a bearer of transaction card 10 interacts therewith. In one embodiment, article 48 is adjacent first portion 44 of subject 46 and/or is configured to be selectively hidden and revealed due to movement of auxiliary member 14 relative to base member 12 as will be further described below.

In one example, an aperture 50 (FIG. 9) is formed through base member 12 to facilitate coupling of base member 12 to auxiliary member 14, for example, sized to receive connection device 16, as will be further described below. In one example, aperture 50 is positioned in the general proximity of a portion of subject 46 not included in first portion 44 of subject 46.

In one embodiment, an opening or slot 52 is defined through base member 12. Slot 52 is sized to receive at least a portion of auxiliary member 14. Slot 52 is elongated and, in one embodiment, is curvilinear such that slot 52 extends a consistent radial distance away from aperture 50 from end to end of slot 52. In one example, slot 52 is positioned on an opposite side of aperture 50 as compared to the portion of subject 46 not depicted by first portion 44 and/or is positioned relatively near to an outer edge 54 of base member 12 as compared to aperture 50.

In one embodiment, auxiliary member 14 is generally a panel defining a first surface 60 and a second surface 62 (FIGS. 3 and 9), opposite first surface 60. One or both of first surface 60 and second surface 62 are substantially planar. In one example, auxiliary member 14 includes at least two sections such as a first section 64, which depicts a second portion 66 of subject 46 not otherwise depicted by first portion 44 of subject 46, and a second or handle section 68. In one embodiment, where subject 46 is an alligator, second portion 66 of subject 46 depicts the upper jaw, eyes, nose, and upper head of the alligator. In one example, an outer perimeter 70 of first section 64 of auxiliary member 14 follows or is substantially coextensive with an outer perimeter of second portion 66 of subject 46 depicted by first section 64 of auxiliary member 14 (e.g., second portion 66 of subject 26 an first section 64 share a substantial portion of an outer perimeter). Otherwise stated, in one embodiment, second portion 66 is positioned immediately adjacent outer perimeter 70 of first section 64 of auxiliary member 14.

Handle section 68 of auxiliary member 14 extends from a first end 72 of first section 64 and terminates at a far end 76 of handle section 68 defined opposite first section 64. In one embodiment, handle section 68 extends away from first section 64 and is substantially linear. In one example, an aperture 74 (FIG. 9) is formed through auxiliary member 14, for instance through a rotational axis of auxiliary member 14, which, as depicted in FIGS. 1-6, extends through first section 64 near first end 72 thereof. Regardless of shape, in one embodiment, auxiliary member 14 has at least one outer dimension that is smaller than an outer dimension of base member 12.

In one embodiment, auxiliary member 14 is formed of a somewhat rigid material, for example, paper, cardstock, plastic (e.g. polycarbonate, polystyrene, PVC, ABS, PET, teslin, PLA or acrylic) or other suitable material. In one example, auxiliary member 14 is formed of a material that is one of transparent and translucent. In such an example, first section 64 is printed with the second portion of subject 46 such that one cannot see through a substantial portion of first section 64. In one example, auxiliary member 14 is formed such that handle section 68 remains transparent or translucent. Although primarily described herein as only having one auxiliary member 14, upon reading this application, it should be understood that additional auxiliary members may be added to transaction card 10.

To assemble transaction card 10, auxiliary member 14 is placed on first surface 20 of base member 12 in a manner coaxially aligning aperture 50 of base member 12 with aperture 74 of auxiliary member 14. In one embodiment, prior to aligning aperture 50 with aperture 74, far end 76 of handle section 68 is thread from first surface 20 of base member 12, through slot 52 and to second surface 22 of base member 12. In one example, upon aligning aperture 50 with aperture 74, far end 76 of handle section 68 extends slightly beyond outer edge 54 of base member 12. In this manner, far end 76 of handle section 68 is positioned to be more easily grasped, pushed, pulled or otherwise manipulated by a bearer of transaction card 10 as will be further described below.

Once auxiliary member 14 and base member 12 are properly aligned, auxiliary member 14 is movably coupled with base member 12. For example, auxiliary member 14 is rotatably coupled with base member 12 by placing connection device 16, such as a rivet, grommet, etc., through aperture 50 and aperture 74 and securing connection device 16 thereto. In one example, where connection device 16 is a grommet, head 80 of the grommet is positioned adjacent auxiliary member 14 and an end 82 of the grommet opposite head 80 is positioned adjacent second surface 22 of base member 12 such that auxiliary member 14 is held against first surface 20 of base member 12. In one embodiment, where auxiliary member 14 is elongated, connection device 16 extends through aperture 74, which is positioned to be spaced from each of opposing longitudinal ends of auxiliary member 14. Connection device 16 allows rotation or other movement of auxiliary member 14 relative to base member 12 while auxiliary member 14 is coupled with base member 12. As such, connection device 16 serves as an axis for rotation of auxiliary member 14. In one example, connection device 16 couples auxiliary member 14 to base member 12 such that auxiliary member 14 rotates about an axis substantially perpendicular to base member 12.

Figure 8:
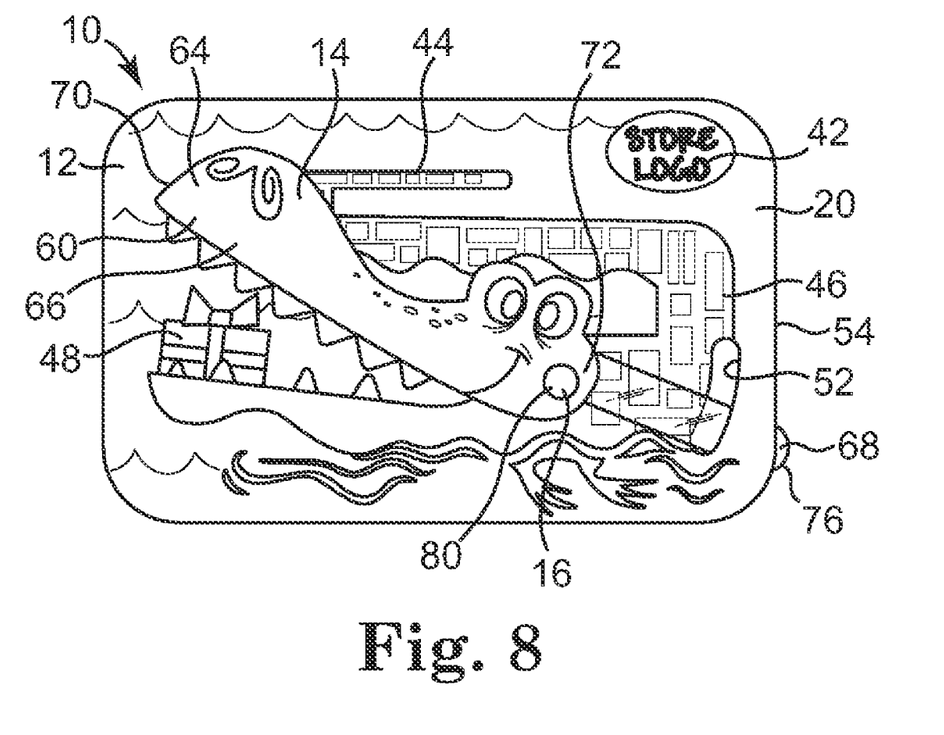
FIG. 8 is a front view illustration of the transaction card of FIG. 1 with the auxiliary member in a second position, according to one embodiment of the invention.

In one example, upon coupling auxiliary member 14 to base member 12, first section 64 of auxiliary member 14, which depicts second portion 66 of subject 46, is aligned with base member 12, which depicts first portion 44 of subject 46, such that base member 12 and first section 64 collectively depict subject 46 as a relative whole. More specifically, auxiliary member 14 is initially coupled to base member 12 in a first position as illustrated in FIGS. 1-7 such that a substantially entirety of article 48 is hidden from view by auxiliary member 14, which is positioned directly on top of article 48. Auxiliary member 14 and base member 12 are coupled such that movement of auxiliary member 14 relative to base member 12 about connection device 16 rotates auxiliary member 14 to a second position as illustrated in FIG. 8 in which article 48 is revealed (e.g., auxiliary member 14 does extend directly over article 48). As such, auxiliary member 14 or at least first section 64 thereof is one example of means for selectively hiding a substantial entirety of article 48 from view.

Figure 10:
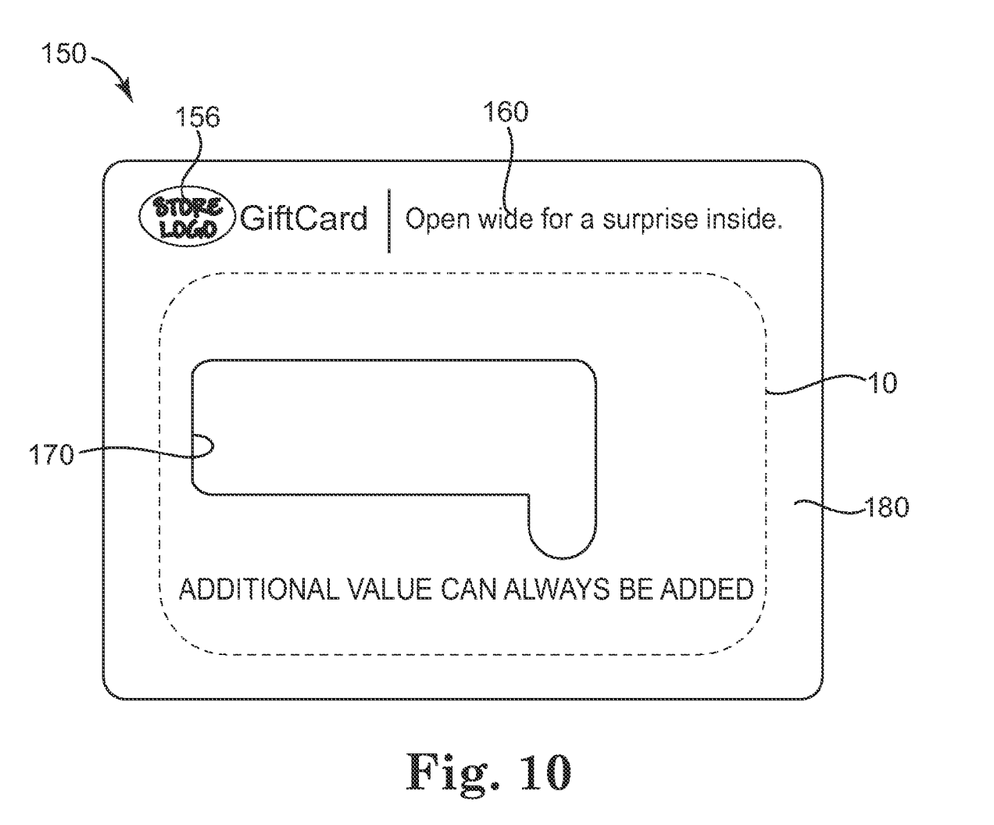
FIG. 10 is a front view illustration of a backer, according to one embodiment of the present invention.
Figure 11:
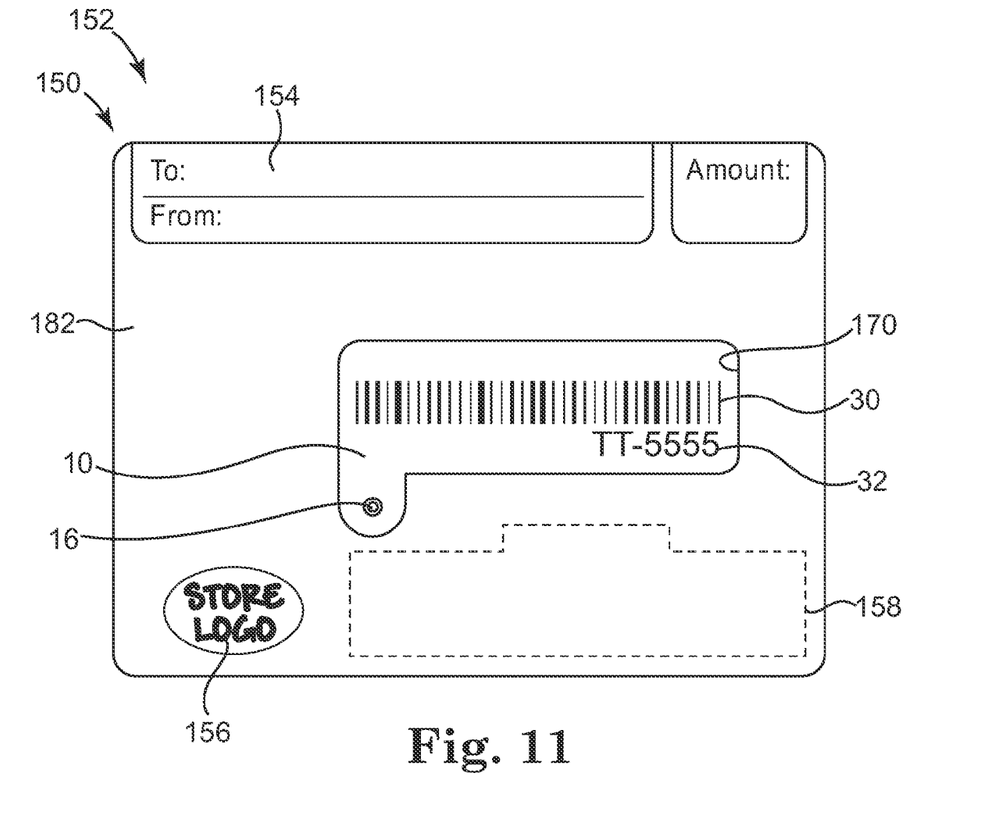
FIG. 11 is a rear view illustration of a transaction card assembly including the backer of FIG. 10 and the transaction card of FIG. 1, according to one embodiment of the present invention.

FIGS. 10 and 11 illustrate a carrier or backer 150 configured to be selectively coupled with and to support transaction card 10. Transaction card 10, which is represented in dashed lines in FIG. 10 for illustrative purposes so as to not obstruct backer 150, is readily releasably attached to backer 150, for example by a removable adhesive, an overlying skinning material, blister packaging or the like. Backer 150 and transaction card 10 collectively define a transaction card assembly 152 (FIG. 11). Backer 150 comprises a single layer or multiple layers of paper or plastic material, for example, generally in the form of a relatively stiff but bendable/flexible card. Use of other materials is also contemplated. Backer 150 displays indicia, graphics or text information including store logo(s), store name(s), slogans, advertising, instructions, directions, brand indicia, promotional information, holiday indicia, seasonal indicia, media format identifiers, characters and/or other information.

For example, referring to FIG. 11, indicia 154 include to, from and amount fields. The fields of indicia 154 provide areas of backer 150 configured to be written upon by a consumer to personalize backer 150 for presentation as a gift to a particular recipient, for a particular purpose and/or to indicate a value of transaction card 10. In one embodiment, backer 150 includes brand indicia 156, which identify a store, brand, department, etc. and/or services associated with transaction card 10.

In one embodiment, backer 150 includes redemption indicia 158, generally indicated by a dashed box in FIG. 11, indicating that transaction card 10 is redeemable for the purchase of goods and/or services and that upon use, a value of the purchased goods and/or services will be deducted from the financial account or record linked to transaction card 10. In one embodiment, redemption indicia 110 include phrases such as "<NAME OF STORE> GiftCard" and "This GiftCard is redeemable for merchandise or services at any of our stores or at our web site," and/or provides help or phone line information in case of a lost, stolen or damaged transaction card 10, etc.

Additionally referring to FIG. 10, in one example, indicia 160 promote the non-transactional or amusing functionality of transaction card 10. In one instance, where subject 46 is an alligator and movement of auxiliary member 14 relative to base member 12 appears as the alligator opening its mouth to reveal article 48, indicia 160 state "Open wide for a surprise inside!" As such, indicia 160 further promote the sale of transaction card 10 by drawing the attention of a potential consumer to the non-transactional and amusing feature(s) of transaction card 10.

Any of indicia 34, 42, 154, 156, 158 and 160, account identifier 30 and/or other indicia optionally may appear anywhere on backer 150 or transaction card 10. Additional information besides that specifically described and illustrated herein may also be included and/or one or more of indicia 34, 42, 154, 156, 158 and 160 may be eliminated.

In one embodiment, backer 150 includes a window or opening 170 for displaying account identifier 30 of transaction card 10 therethrough as illustrated in FIG. 11. As previously described, account identifier 30 is adapted for accessing an account or a record associated with transaction card 10 for activating, loading value to or debiting value from the account or record. In one example, transaction card 10 is coupled with or positioned adjacent a first or front surface 180 (FIG. 10) of backer 150, and a bearer viewing a second or rear surface 182 (FIG. 11) of backer 150, which is opposite front surface 180, can view or access account identifier 30 through opening 170. Accordingly, opening 170 allows viewing or other access to account identifier 30 to activate and/or load transaction card 10 without removing transaction card 10 from backer 150. In one embodiment, a portion of backer 150 alternatively is configured to be folded away from the remainder of backer 150 to access account identifier 30 without removing transaction card 10 from backer 150. Other foldable or non-foldable backers can be used having various sizes and shapes for supporting transaction card 10.

Figure 12:
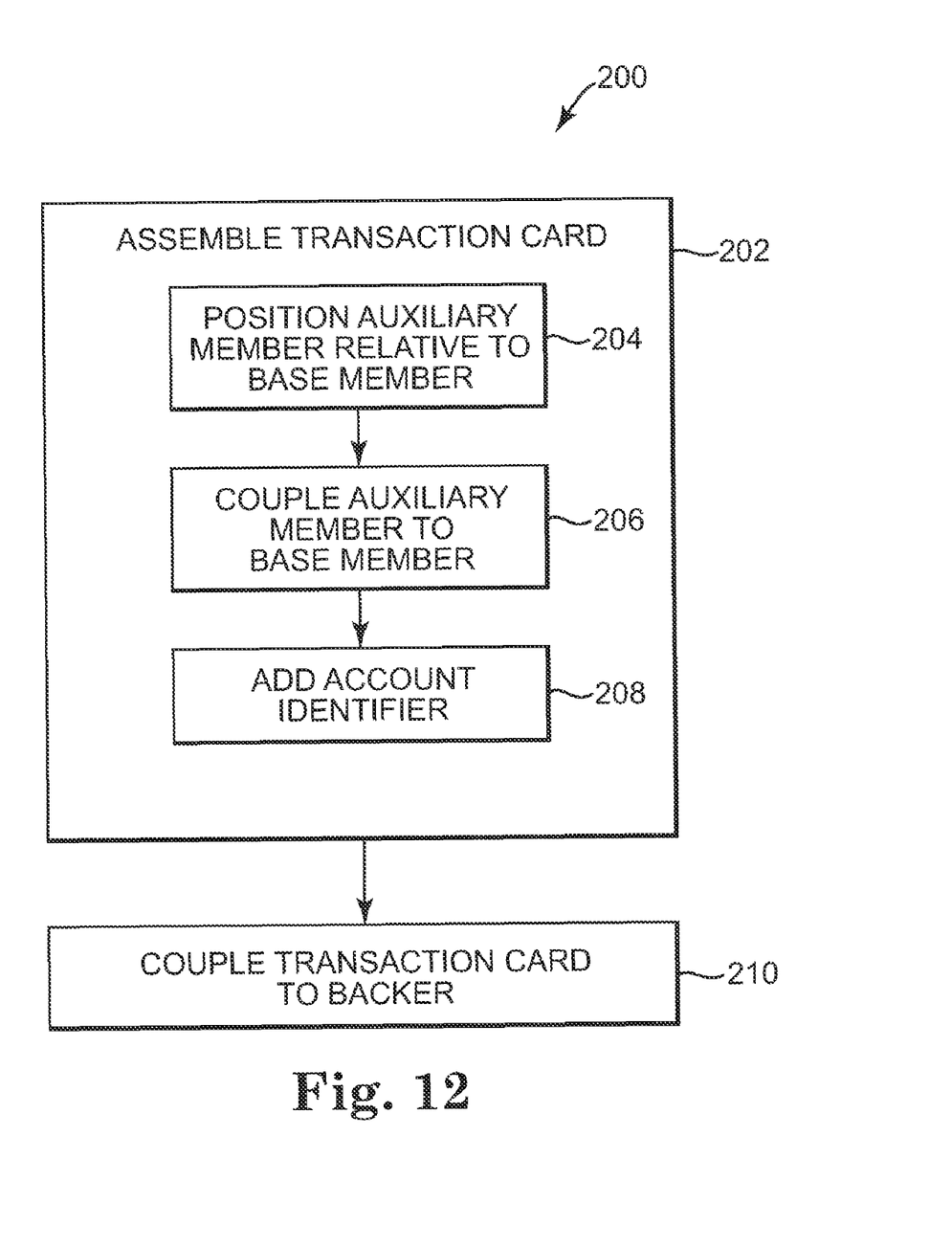
FIG. 12 is a flow chart illustrating a method of assembling a transaction card assembly, according to one embodiment of the present invention.

FIG. 12 is a flow chart illustrating a method of assembling transaction card assembly 152 as generally indicated at 200. At 202, transaction card 10 is assembled. More particularly, at 204, auxiliary member 14 is positioned relative to first surface 20 of base member 12 in a manner coaxially aligning aperture 50 of base member 12 with aperture 74 of auxiliary member 14, and aligning second portion 66 of subject 46 as depicted by auxiliary member 14 with first portion 44 of subject 46 as depicted by base member 12 to collectively depict subject 46 as a relative whole. In one embodiment, prior to aligning aperture 50 with aperture 74, far end 76 of handle section 68 of auxiliary member 14 is thread from first surface 20 of base member 12, through slot 52 and to second surface 22 of base member 12 such that far end 76 of handle section 68 extends slightly beyond outer edge 54 of base member 12. In this manner, far end 76 of handle section 68 is positioned to be more easily grasped, pushed, pulled or otherwise manipulated by a bearer of transaction card 10 as will be further described below. As such, handle section 68 or at least far end 76 thereof is one example of means for facilitating user interaction with auxiliary member 14 and transaction card 10 as a whole.

Once auxiliary member 14 and base member 12 are properly aligned, then at 206, auxiliary member 14 is movably coupled with base member 12, for example, with connection device 16 that extends through aperture 50 and aperture 74. Connection device 16 allows rotation or other movement of auxiliary member 14 relative to base member 12 while auxiliary member 14 is coupled with base member 12. In one example, upon coupling auxiliary member 14 with base member 12, auxiliary member 14 is initially in a first position (FIGS. 1-7) covering article 48 and is movable (e.g., rotatable about connection device 16) to a second position (FIG. 8) uncovering or otherwise revealing article 48.

Upon assembly of auxiliary member 14 to base member 12, in one example, slot 52 serves as a blocking or limiting feature configured to limit rotation or other movement of auxiliary member 14 relative to base member 12. In particular, in one example, a length of slot 52 limits movement of handle section 68 and, therefore, of auxiliary member 14 as a whole. More specifically, when handle section 68 contacts either longitudinal end of slot 52, auxiliary member 14 can no longer be rotated in that direction. As such, each longitudinal end of slot 52 functions as a limit for movement of auxiliary member 14. In one example, a length defined by slot 52 is configured to limit rotation of auxiliary member 14 to an angle of less than 90°, and in one embodiment to an angle of less than 45°. In view of the above example, slot 52 is one example of means for limiting movement of auxiliary member 14 relative to base member 12 between a first limit and a second limit.

At 208, account identifier 30 is added to transaction card 10, for example, to second surface 22 of base member 12, if account identifier 30 is not already part of transaction card 10. Although illustrated in FIG. 12 as occurring after both of operations 204 and 206, it should be understood that account identifier 30 may be applied to any portion of transaction card 10 at any suitable time during manufacturing and assembly thereof. For example, account identifier 30 may be molded into or otherwise integrally formed as part of base member 12 and/or auxiliary member 14 before or after one or more of operations 204 and 206 as will be apparent to those of skill in the art upon reading this application.

At 210, transaction card 10 is coupled with backer 150 as generally illustrated with additional reference to FIGS. 10 and 11 to form transaction card assembly 152. As described above, transaction card 10 may be adhered, skinned to, blister packed with or otherwise suitably coupled to backer 150. In one embodiment, account identifier 30 of transaction card 10 is accessible for scanning while transaction card 10 is coupled with backer 150, for example, through opening 170 in backer 150.

Figure 13:
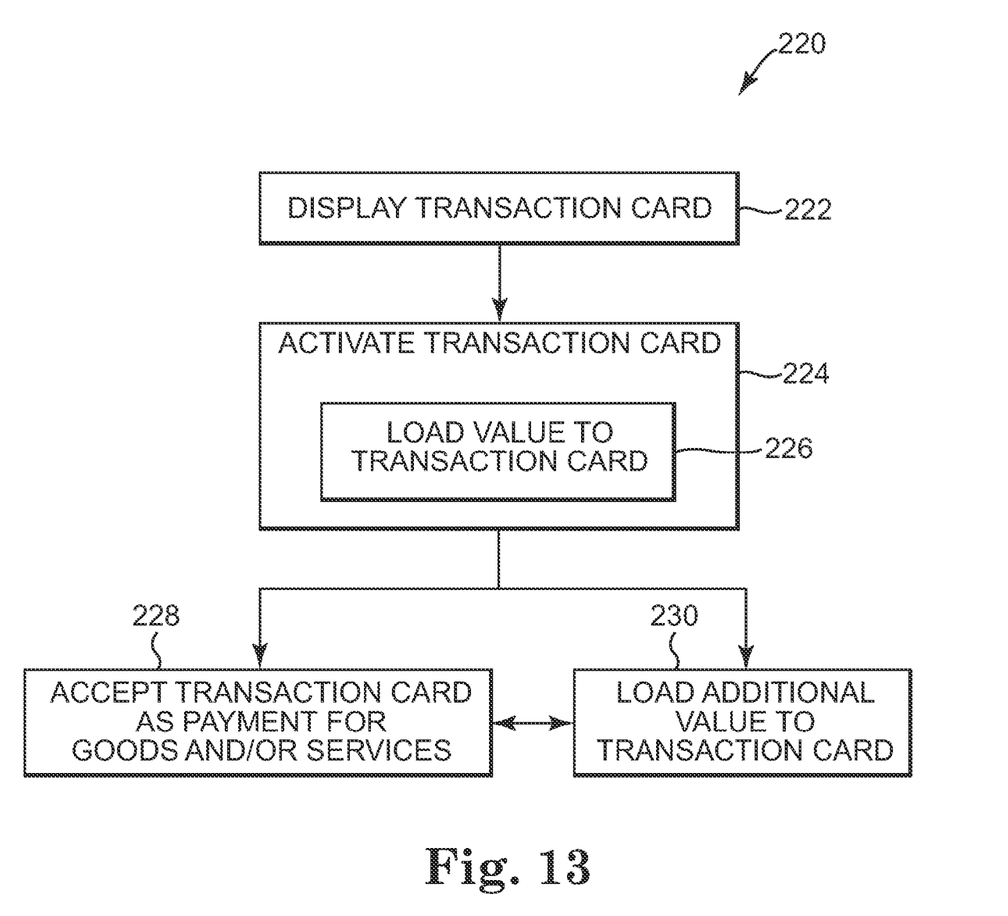
FIG. 13 is a flow chart illustrating a method of encouraging purchase and facilitating use of a transaction card, according to one embodiment the present invention.

FIG. 13 is a flow chart illustrating one embodiment of a method 220 of encouraging purchase and facilitating use of transaction card 10 by consumers and/or recipients. At 222, transaction card 10 is placed on or hung from a rack, shelf, or other similar device to display transaction card 10 for sale to potential consumers. For example, additionally referring to FIGS. 10 and 11, transaction card assembly 152 is placed on a display rack such that transaction card 10 is readily visible to potential consumers. In one embodiment, a depiction of transaction card 10 is placed on a web site for viewing and purchase by potential consumers.

At 224, a consumer who has decided to purchase transaction card 10 presents transaction card 10 on backer 150 to a retail store employee, retail store kiosk, remote terminal, or other person or device to scan account identifier 30 to access an account or record linked to account identifier 30. In particular, account identifier 30 is scanned or otherwise accessed, for example through opening 170 of backer 150 to activate transaction card 10. Upon accessing the account or record, then, at 226, value is added to the account or record in the form of monetary value, points, minutes, etc. Thus, transaction card 10 is activated and loaded.

In one example, a predetermined value is associated with transaction card 10 (i.e., associated with the account or record linked to transaction card 10 via account identifier 30) prior to activation and display, but such predetermined value is not initially available for use toward the purchase or use of goods and/or services. In such an embodiment, at 224, transaction card 10 is activated to permit subsequent access to the predetermined value (e.g., subsequent loading on and debiting from the account or record) and no additional value is added during activation such that operation 226 may be eliminated.

Once transaction card 10 is activated and loaded, transaction card 10 can be used by the consumer or any other bearer of transaction card 10 to purchase goods and/or services at the affiliated retail setting (e.g., a retail store or web site) or can be used in exchange for calling minutes, etc. In one embodiment, where transaction card 10 is displayed on a web site at 222, then, at 224, transaction card 10 may be activated in any suitable method and may not require the physical scanning of account identifier 30 to be activated or to otherwise access the associated account or record such as at 226.

In one example, at 228, the retail store or other affiliated retail setting or web site accepts transaction card 10 as payment toward the purchase of goods and/or services made by the current bearer of transaction card 10. In particular, the value currently loaded on transaction card 10 (i.e., stored or recorded in the account or record linked to account identifier 30) is applied toward the purchase of goods and/or services. At 230, additional value is optionally loaded on transaction card 10 at a point-of-sale terminal, kiosk or other area of the retail store or related setting. Upon accepting transaction card 10 as payment at 228, the retail store or related setting can subsequently perform either operation 228 or operation 230 as requested by a current bearer of transaction card 10. Similarly, upon loading additional value on transaction card 10 at 230, the retail store or related setting can subsequently perform either operation 230 again or operation 228. In one example, the ability to accept transaction card 10 as payment for goods and/or services is limited by whether the account or record associated with transaction card 10 has any value stored or recorded therein at the time of attempted redemption.

Figure 14:
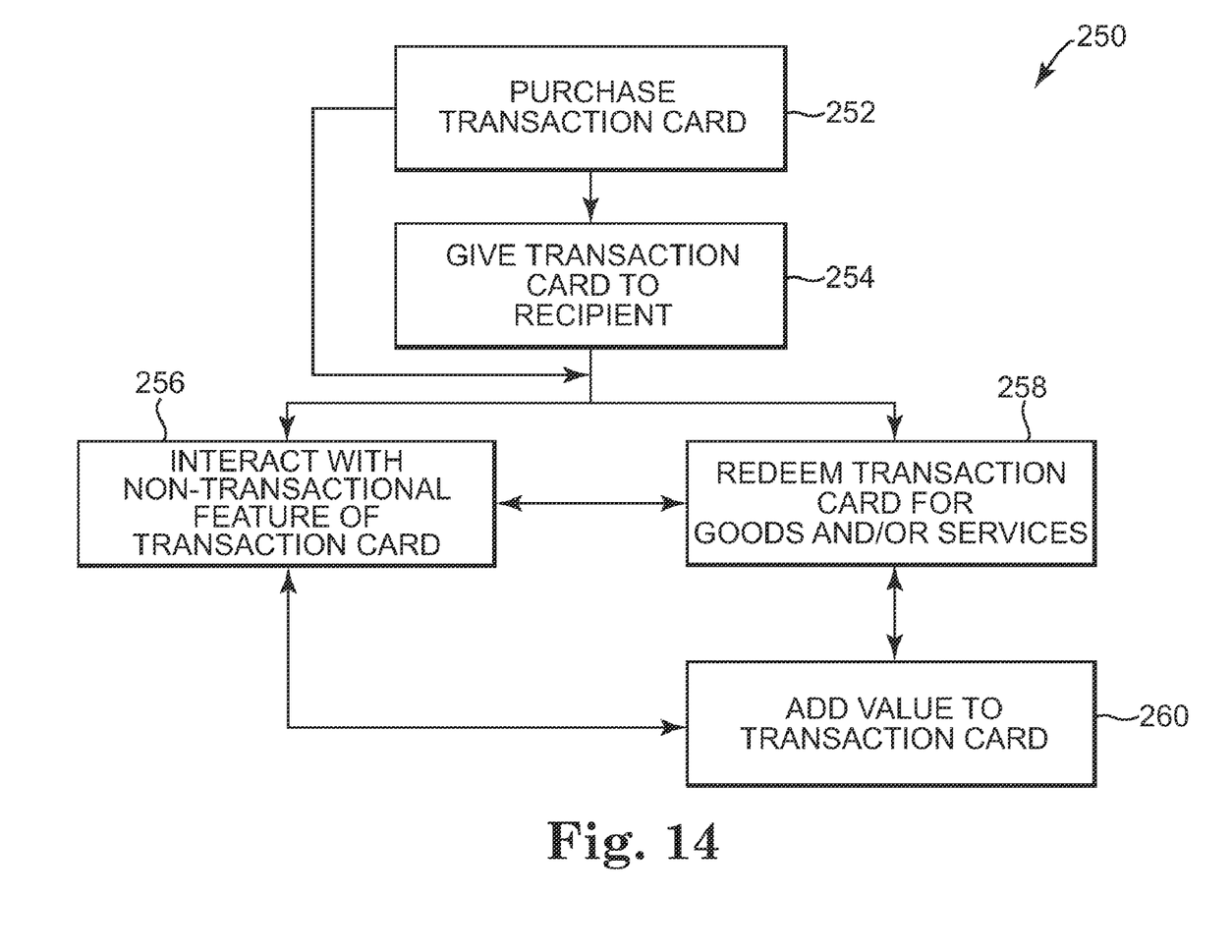
FIG. 14 is a flow chart illustrating a method of using a transaction card, according to one embodiment of the present invention.

FIG. 14 is a flow chart illustrating one embodiment of a method 250 of using transaction card 10 (e.g., FIGS. 1-9). At 252, a potential consumer of transaction card 10, which is displayed in a retail store or viewed on a web site, decides to and does purchase transaction card 10 from the retail store or web site. It should be understood that transaction card 10 can be displayed and purchased alone or as part of transaction card assembly 152 (FIG. 11) along with backer 150. Upon purchasing transaction card 10, a retail store employee, a retail store kiosk or other person or device scans account identifier 30 (FIGS. 3 and 11) through opening 170 of backer 150 or otherwise reads or accesses account identifier 30. Upon accessing account identifier 30, the account or record linked to account identifier 30 is accessed and activated to load value onto transaction card 10 (i.e., load value to the account or record associated with transaction card 10). In one embodiment, such as where transaction card 10 is purchased at 252 via a web site, actual scanning or other mechanical detection of account identifier 30 may be eliminated.

At 254, the consumer optionally gives transaction card 10 to a recipient, such as a graduate, relative, friend, expectant parents, one having a recent or impending birthday, a couple having a recent or impending anniversary, etc. In one embodiment, a plurality of transaction cards 10 are purchased and given to party goers, such as at a birthday party, etc. as party favors or gifts. As an alternative, the consumer can keep transaction card 10 for his or her own use thereby eliminating operation 254.

At 256, the consumer, recipient, or other current bearer of transaction card 10 interacts with the non-transactional feature thereof for amusement. More specifically, the bearer of transaction card 10 interacts with far end 76 of handle section 68 of auxiliary member 14 to move auxiliary member 14 relative to base member 12. In one example, the bearer moves handle section 68 downward, which causes clockwise rotation of auxiliary member 14 about connection device 16 from the first position (FIGS. 1-7) to the second position (FIG. 8). Movement of auxiliary member 14 causes movement of second portion 66 of subject 46 in a manner that visually appears as animation or animated movement of subject 46. In one example, animated movement of subject 46 appears as rotation about an expected rotational joint (e.g., a shoulder, elbow, wrist, jaw, hip, knee, or ankle) especially where subject 46 is one of an animal, a person, an insect and a fictional character. For instance, where subject 46 is an alligator, movement of second portion 66, which depicts the upper jaw, eyes, nose and upper head of the alligator, relative to first portion 44, which depicts the lower jaw and other portion of the alligator, appears as though the alligator is opening and closing its mouth.

In one embodiment, the above-described animation is additionally configured to result in the uncovering of article 48 on first surface 20 of base member 12, for example, positioned to appear as though the depicted article is being held in the mouth of the alligator, to the surprise of the bearer. Subsequently, the bearer may move far end 76 of handle section 68 upward relative to base member 12, which causes clockwise rotation of auxiliary member 14 about connection device 16 from the second position back to the first position (e.g., closes the alligator's mouth) once again covering article 48. This apparent animation and the repeatable surprise of the reveal of article 48 amuse the bearer of transaction card 10.

At 258, the consumer or recipient redeems transaction card 10 for goods and/or services from the retail store or web site. At 260, the consumer or recipient of transaction card 10 optionally adds value to transaction card 10, more particularly, to the account or record associated with account identifier 30 included therewith, at the retail store or over the Internet (i.e., via the web site). Upon interacting with the non-transaction feature of transaction card 10 at 256, redeeming transaction card 10 at 258 or adding value to transaction card 10 at 260, the consumer or recipient of transaction card 10 subsequently can perform either of operations 256, 258 or 260 as desired. In one embodiment, the ability of the consumer or recipient to repeat redeeming transaction card 10 at 258 is limited by whether the account or record linked with transaction card 10 has any remaining value stored or recorded therein at the time of attempted redemption.

Although described above as occurring at a single retail store or web site, in one embodiment, purchasing transaction card 10 at 252, redeeming transaction card 10 at 258 and adding value to transaction card 10 at 260, can each be performed at any one of a number of stores adapted to accept transaction card 10 or over the Internet. In one example, a number of stores are each part of a chain or are similarly branded stores. In one example, a number of stores include at least one web site and/or at least one conventional brick and mortar store.

Transaction cards come in many forms, according to embodiments of the invention. The gift card, like other transaction cards, can be "re-charged" or "re-loaded" at the direction of the original consumer, the gift recipient or a third party. The term "loading on" or "loaded on" herein should be interpreted to include adding to the balance of an account or record associated with a transaction card. The balance associated with the transaction card declines as the card is used, encouraging repeat visits or use. The card remains in the user's purse or wallet, serving as an advertisement or a reminder to revisit the associated merchant. Gift cards according to embodiments of the invention provide a number of advantages to both the consumer and the merchant. Other gift cards and transaction cards according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are meant for illustrative purposes only and should not be considered to limit the invention. Various alternatives and changes will be apparent to those of ordinary skill in the art. Other modifications within the scope of the invention and its various embodiments will be apparent to those of ordinary skill.

What is claimed is:

1. A transaction card comprising:
 a base member defining a first surface, a second surface opposite the first surface and a slot extending through the base member;
 an elongated auxiliary member including a first section and a handle section, the auxiliary member being coupled with the base member such that the first section is disposed on the first surface of the base member and the handle section extends from the first surface of the base member, through the slot and to the second surface of the base member such that movement of the handle section causes movement of the first section of the auxiliary member relative to the base member; and
 an account identifier included on one of the base member and the auxiliary member, wherein the account identifier links the transaction card to at least one of an account and a record and is machine readable by a point-of-sale terminal.

2. The transaction card of claim 1, wherein the account identifier is a bar code.

3. The transaction card of claim 1, wherein the account identifier includes at least one of a bar code, a magnetic strip, a smart chip, and a radio frequency identification (RFID) device.

4. The transaction card of claim 1, wherein movement of the handle section causes rotation of the first section of the auxiliary member relative to the base member.

5. The transaction card of claim 1, wherein the auxiliary member is rotatably coupled to the base member with a connection device such that the auxiliary member rotates relative to the base member about the connection device.

6. The transaction card of claim 1, wherein the base member defines a first portion of a subject and the auxiliary member defines a second portion of the subject such that movement of the auxiliary member appears as animated movement of the second portion of the subject relative to the first portion of the subject.

7. The transaction card of claim 6, wherein the subject is one of an animal, a person, an insect and a fictional character.

8. The transaction card of claim 7, wherein the animated movement of the second portion of the subject relative to the first portion of the subject appears as movement of the second portion about a rotational joint of the subject.

9. The transaction card of claim 6, wherein the first portion of the subject includes a lower jaw of the subject and the second portion of the subject includes an upper jaw of the subject such that movement of the second portion relative to the first portion appears as opening and closing a mouth of the subject.

10. The transaction card of claim 1, wherein the base member depicts an article, and the auxiliary member is coupled with the base member such that the article is hidden by the auxiliary member when the auxiliary member is in a first position and the article is revealed when the auxiliary member is in a second position.

11. The transaction card of claim 1, wherein the auxiliary member defines opposing longitudinal ends and is configured to rotate about an axis spaced from each of the opposing longitudinal ends of the auxiliary member.

12. The transaction card of claim 1, wherein the account identifier is located on the second surface of the base member.

13. The transaction card of claim 1, wherein movement of the auxiliary member is limited by a length of the slot.

14. The transaction card of claim 1, wherein the handle section extends beyond an outer perimeter of the base member.

15. A stored-value card comprising:
 a substantially planar substrate depicting an object;
 means for selectively hiding a substantial entirety of the object from view; wherein the means for selectively hiding is movably coupled with the substantially planar substrate;
 means for limiting movement of the means for selectively hiding between a first limit and a second limit; and
 means for linking the substantially planar substrate with at least one of an account and a record having a value associated therewith such that the substantially planar substrate can be used as payment toward a purchase of one or more of goods and services.

16. The stored-value card of claim 15, wherein the substantially planar substrate depicts a first portion of a graphic, and the means for selectively hiding depicts a second portion of the graphic such that movement of the means for selectively hiding relative to the substantially planar substrate appears as animated movement of the second portion of the graphic relative to the first portion of the graphic.

17. The stored-value card of claim 15, wherein the means for selectively hiding is coupled with means for facilitating user interaction with the stored-value card, and the means for facilitating user interaction with the stored-value card extends beyond an outer perimeter of the substantially planar substrate, such that a bearer of the stored-value card can initiate movement of the means for selectively hiding by moving the means for facilitating user interaction with the stored-value card.

18. A method of assembling a transaction product, the method comprising:
 coupling a second member to a first member such that the second member is rotatable about an axis substantially perpendicular to the first member while remaining coupled to the first member, wherein the first member depicts a first portion of a picture, the second member depicts a second portion of the picture such that the second member and the second portion share at least a substantial portion of an outer perimeter, the second member has smaller overall dimensions than the first member such that the first member is readily viewable around substantially all of the second member, and the first member and the second member are each substantially planar; and
 adding an account identifier to one of the first member and the second member, wherein the account identifier links the transaction product to an account or a record such that the transaction product can be used during a purchase transaction to apply at least a portion of a balance of the account or the record toward a price of a purchase.

19. The method of claim 18 further comprising providing a blocking feature, which interacts with the second member to limit rotation of the second member relative to the first member to an angle of less than about 90°.

20. The method of claim 18, wherein the first member depicts an object, and coupling the second member to the first member includes positioning the second member to cover the object when the second member is moved to a first position relative to the first member and to uncover the object when the second member is moved to a second position relative to the first member.

21. A method of encouraging purchase and facilitating use of a stored-value card linked to a record or account, the method comprising:
 displaying the stored-value card to a potential consumer, wherein the stored-value card includes a substrate, a movable member coupled to the substrate, and an object positioned on a first surface, wherein the object is hidden from view when the movable member is in a first position relative to the substrate, the object is readily viewable when the movable member is in a second position relative to the substrate, and the movable member includes a handle extending beyond an outer edge of the substrate such that movement of the handle causes the movable member to transition between the first position and the second position; and activating the record or account linked to the stored-value card to permit subsequent deductions from a value associated with the record or account for application toward one of a purchase and a use of one or more of goods and services.

22. The method of claim 21, wherein displaying the stored-value card to the potential consumer includes positioning the handle to be movable by the potential consumer while the stored-value card is displayed.

* * * * *